United States Patent [19]

Sato et al.

[11] 4,068,583

[45] Jan. 17, 1978

[54] HAMMER ACTUATED DOT MATRIX PATTERN PRINTER

[75] Inventors: Fumio Sato, Higashiosaka; Shigeru Fujimura; Toshio Urakawa, both of Yamatokoriyama, all of Japan

[73] Assignee: Sharp Kabushiki Kaisha, Osaka, Japan

[21] Appl. No.: 713,246

[22] Filed: Aug. 10, 1976

[30] Foreign Application Priority Data

Aug. 12, 1975 Japan .................................. 50-98252

[51] Int. Cl.² .................................................. G02B 5/12

[52] U.S. Cl. .................................. 101/93.04; 197/1 R

[58] Field of Search ...................... 197/1 R; 101/93.04, 101/93.05, 93.37, 93.28, 93.29; 346/101, 141

[56] References Cited

U.S. PATENT DOCUMENTS

| | | | |
|---|---|---|---|
| 2,656,240 | 10/1953 | Hell | 197/1 R |
| 3,444,975 | 5/1969 | Simshauser | 197/1 R |
| 3,812,495 | 5/1974 | Venker | 197/1 R X |
| 3,918,567 | 11/1975 | Kittredge | 197/1 R |

*Primary Examiner*—Ralph T. Rader

*Attorney, Agent, or Firm*—Birch, Stewart, Kolasch & Birch

[57] ABSTRACT

A dot matrix pattern printer of the impact type mainly comprises a hammer of which an active portion is flattened to have a predetermined length in the lateral direction, and a vertical line element which has a predetermined length in the vertical direction and is driven to shift its position in the lateral direction. Combination of the hammer actuation, the vertical line element location, and a paper feed in the vertical direction provides a printed pattern in, for example a 5 × 7 dot matrix pattern.

6 Claims, 9 Drawing Figures

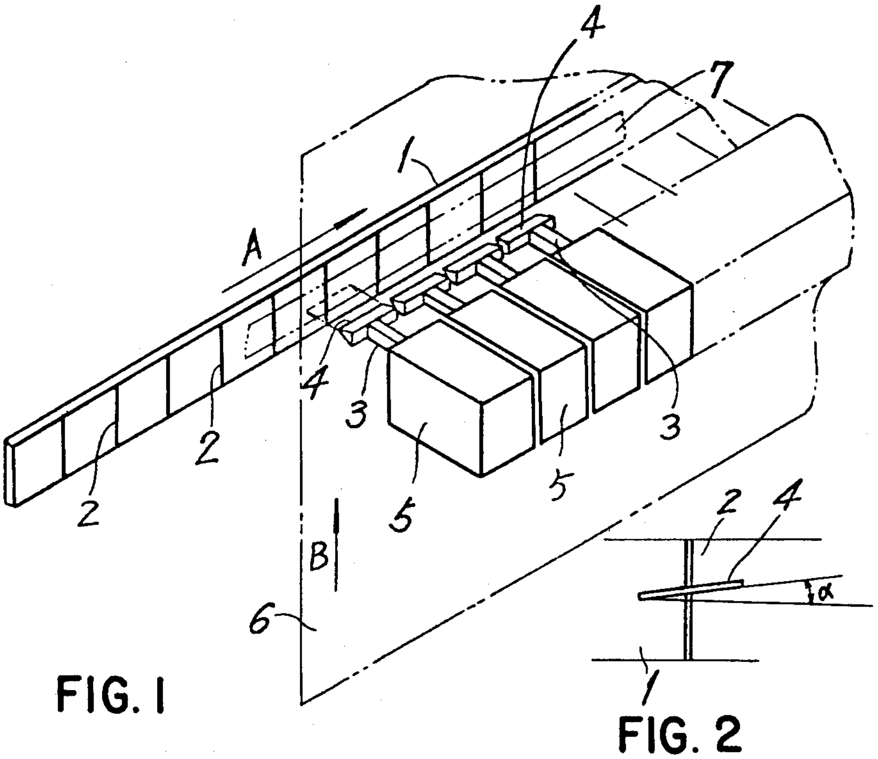
FIG. 1
FIG. 2
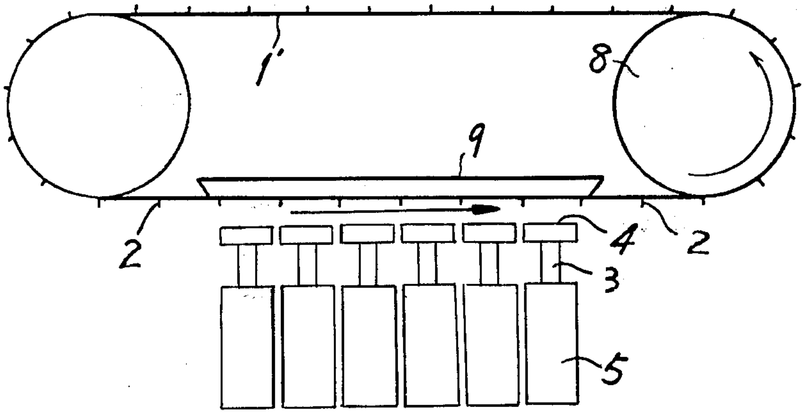
FIG. 4

HAMMER ACTUATED DOT MATRIX PATTERN PRINTER

BACKGROUND AND SUMMARY OF THE INVENTION

The present invention relates to an impact type printer which provides a printed character in a dot matrix pattern.

Two types of the dot matrix pattern printer of the impact type have been proposed. In one method, a wire is actuated to strike dot shaped projections, thereby to print characters in the dot matrix pattern. In another method, two groups of parallel line elements are provided in such a manner to cross each other, thereby to print dots at the crossing points of the two groups of parallel line elements. The present invention relates to the latter method, or, the system to print dots at the crossing points of two groups of line elements.

However, the conventional dot matrix pattern printer of the impact type requires a large space and is difficult to manufacture. This is because the conventional system employs a drum around which projections are formed, and a hammer, whereby the printing is achieved on a paper which is driven to travel through a clearance provided between the hammer and the drum.

Accordingly, an object of the present invention is to provide a small size dot matrix pattern printer of the impact type.

Another object of the present invention is to provide an impact type printer which provides a printed character in a dot matrix pattern without use of a printing drum. Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a vertical line element carrier is provided on which a plurality of parallel lines are formed in the vertical direction with a predetermined space, the vertical line element carrier being driven to travel in the lateral direction. A hammer is also provided of which an active portion is flattened to have a predetermined length in the lateral direction. Combination of the hammer, the vertical line element location, and a paper feed in the vertical direction provides a printed dot at the point where the vertical line element crosses the hammer.

BRIEF DESCRIPTION OF THE DRAWINGS

The present invention will become more fully understood from the detailed description given hereinbelow and the accompanying drawings which are given by way of illustration only, and thus are not limitative of the present invention and wherein, FIG. 1 is a perspective view of an embodiment of a printer of the present invention;

FIG. 2 is a schematic front view showing a relationship between a hammer and a vertical line element;

FIG. 4 is a plan view of another embodiment of a printer of the present invention.

DESCRIPTION OF THE PREFERRED EMBODIMENTS

Figure 3A:
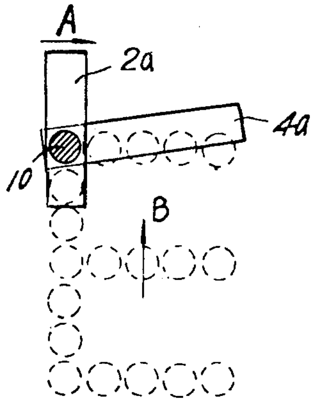
FIGS. 3(A) through 3(D) show an operation of the printer of FIG. 1.

Referring now to FIG. 1, there is illustrated an embodiment of a printer of the present invention, in which a vertical line element carrier 1 made of a flexible plate is driven to travel at a constant velocity in the direction shown by an arrow A. A plurality of parallel line projections, or, vertical line elements 2 are formed on the vertical line element carrier 1 at a predetermined space, the space being selected at a value corresponding to one character width. A plurality of hammers 3 are aligned in the lateral direction and driven to reciprocate in the direction perpendicular to a printing paper 6 by a suitable driving means 5. Projections 4 are fixed to the pointed edges of the hammers 3, the projections 4 having flattened edges of a predetermined length in the lateral direction, which act as lateral line elements. The hammers 3 and the vertical line element carrier 1 are arranged in such a relationship that a dot is printed on the printing paper 6 at a point where the vertical line element 2 crosses the projection 4 when the hammer 3 is actuated by the driving means 5.

The printing paper 6 is positioned behind the vertical line element carrier 1 and driven to travel at a constant velocity in the direction shown by an arrow B. An ink ribbon 7 is interposed between the printing paper 6 and the vertical line element carrier 1, thereby to print a dot on the printing paper 6 at the crossing point of the vertical line element 2 and the projection 4.

In a preferred form, the projections 4 fixed to the hammers 3 are slightly inclined, by an angle $\alpha$, with respect to the perpendicular line to the vertical line element 2 as shown in FIG. 2, in order to provide a rectangular dot matrix pattern.

FIGS. 3(A) through 3(D) show an operation of the printer of FIG. 1, wherein a capital "E" is printed in a $5 \times 7$ dot matrix pattern.

When a print start command is generated from a control circuit (not shown), a motor (not shown) is activated, and the vertical line element carrier 1 and the printing paper 6 are driven to travel at constant velocities in the directions shown by the arrows A and B, respectively.

Figure 3B:
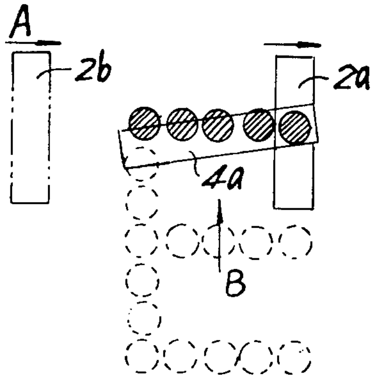

When a vertical line element $\mathbf{2}_a$ formed on the vertical line element carrier 1 becomes a position corresponding to the left end of one projection $\mathbf{4}_a$ fixed to one hammer 3 as shown in FIG. 3(A), the hammer 3 is associated with the projection $\mathbf{4}_a$ is activated, whereby a dot 10 is printed on the printing paper 6 at the point where the vertical line element $\mathbf{2}_a$ crosses the projection $\mathbf{4}_a$. The first row can be printed as shown in FIG. 3(B) by intermittently activating the hammer 3 associated with the projection $\mathbf{4}_a$ at predetermined times when the vertical line element $\mathbf{2}_a$ is located at predetermined positions during its travel in the direction shown by the arrow A. The row can be laterally printed, even though the printing paper 6 is continuously driven to travel at constant velocity in the direction B during the one row printing period, because the projection $\mathbf{4}_a$ fixed to the hammer 3 is inclined by the angle $\alpha$ with respect to the horizontal line.

Figure 3D:
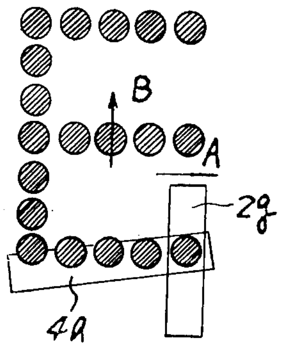
Figure 3C:
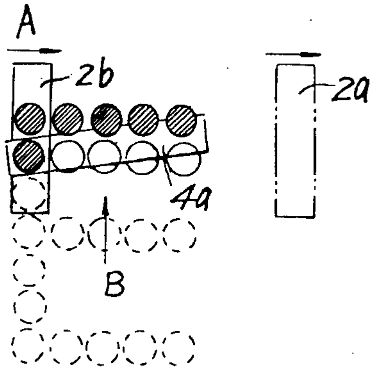

When the following vertical line element $\mathbf{2}_b$ formed on the vertical line element carrier 1 appears at the left end of the projection $4_a$ fixed to the hammer 3, the hammer 3 associated with the projection $4_a$ is activated, thereby to print the dot at the second row and the first column of the dot matrix pattern as shown in FIG. 3(C). This is because that the printing paper 6 is driven to travel in the direction shown by the arrow B, and the projection $4_a$ is positioned at the second row when the vertical line element $2_b$ appears at the left end of the projection $4_a$.

In this manner, one character printing is completed when seven vertical line elements $2_a$ through $2_g$ have passed the projection $4_a$ as shown in FIG. 3(D). After completion of one character printing, the vertical line element carrier 1 is driven backward to its initial position and prepared for the printing of the following line.

When a plurality of hammers 3 are aligned in the lateral direction as shown in FIG. 1 and the vertical line elements 2 are formed with a distance identical with that of the hammer 3, a plurality of characters can be simultaneously printed on the same line by selectively energizing the driving means 5 associated with the hammer 3 in accordance with the printing information.

FIG. 4 shows another embodiment of the present invention, wherein the vertical line element carrier 1 is made of a belt 1', which is driven to rotate through the use of a driving roller 8. In this example, the vertical line element carrier 1' is continuously driven in one direction during printing of a plurality of lines. In the drawing, 9 represents a platen.

Figure 5:
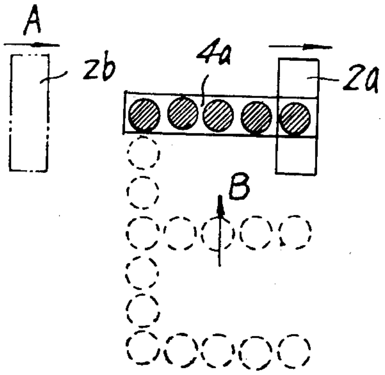
FIG. 5 shows an operation of still another embodiment of a printer of the present invention.

When the printing paper 6 is intermittently driven in synchronization with the one row printing, the projections 4 can be provided at a right angle with respect to the vertical line elements 2 as shown in FIG. 5.

The invention being thus described, it will be obvious that the same way be varied in many ways. Such variations are not to be regarded as a departure from the spirit and scope of the invention, and all such modifications are intended to be included within the scope of the following claims.

What is claimed is:

1. A dot matrix pattern printer of the impact type comprising:

a. a vertical line element carrier;
b. a plurality of vertical line elements formed on the vertical line element carrier with a predetermined distance therebetween equal to one printed character width;
c. a driving means for driving the vertical line element carrier at a predetermined velocity in the lateral direction corresponding to a line of characters to be printed;
d. a hammer adjacent said vertical line element carrier;
e. means for actuating the hammer;
f. a projection fixed to the active end of the hammer, the projection having a predetermined length in the lateral direction substantially equal to the width of the dot matrix defining a said printed character and said hammer being responsive to said actuating means to impact said projection with selected ones of said vertical line elements as the latter traverse said dot matrix;
g. a recording paper disposed between said vertical line elements and said hammer; and
h. means for shifting the recording paper in the vertical direction to scan said dot matrix of a character to be printed in cooperation with said vertical line elements.

2. The printer of claim 1, wherein the recording paper is driven to continuously shift its position, and the projection is slightly inclined with respect to the lateral direction to compensate for said continuous shift of said paper.

3. A dot matrix pattern printer of the impact type comprising:

a. a vertical line element carrier;
b. a plurality of vertical line elements formed on the vertical line element carrier with a predetermined distance therebetween equal to one printed character width;
c. a driving means for driving the vertical line element carrier at a predetermined velocity in the lateral direction corresponding to a line of characters to be printed;
d. a plurality of hammers aligned in the lateral direction adjacent said vertical line element carrier;
e. means for actuating the hammers;
f. projections fixed to the active ends of the hammers, the projections having predetermined length in the lateral direction substantially equal to the width of the dot matrix defining a said printed character and said hammers being responsive to said actuating means to impact said projections with selected ones of said vertical line elements as the latter traverse said dot matrix;
g. a recording paper disposed between said vertical line elements and said hammers and
h. means for shifting the recording paper in the vertical direction to scan said dot matrix of a character to be printed in cooperation with said vertical line elements.

4. The printer of claim 3, wherein the hammers are aligned with a lateral separation distance identical with that of the vertical line elements formed on the vertical line element carrier.

5. The printer of claim 3 wherein the recording paper is driven to continuously shift its position, and the projection is slightly inclined with respect to the lateral direction to compensate for said continuous shift of said paper.

6. The printer of claim 3, wherein the hammers are aligned with a lateral separation distance identical with that of the vertical line elements formed on the vertical line element carrier;

the recording paper is driven to continuously shift its position, and the projection is slightly inclined with respect to the lateral direction to compensate for said continuous shift of said paper.

* * * * *